Figure 1:
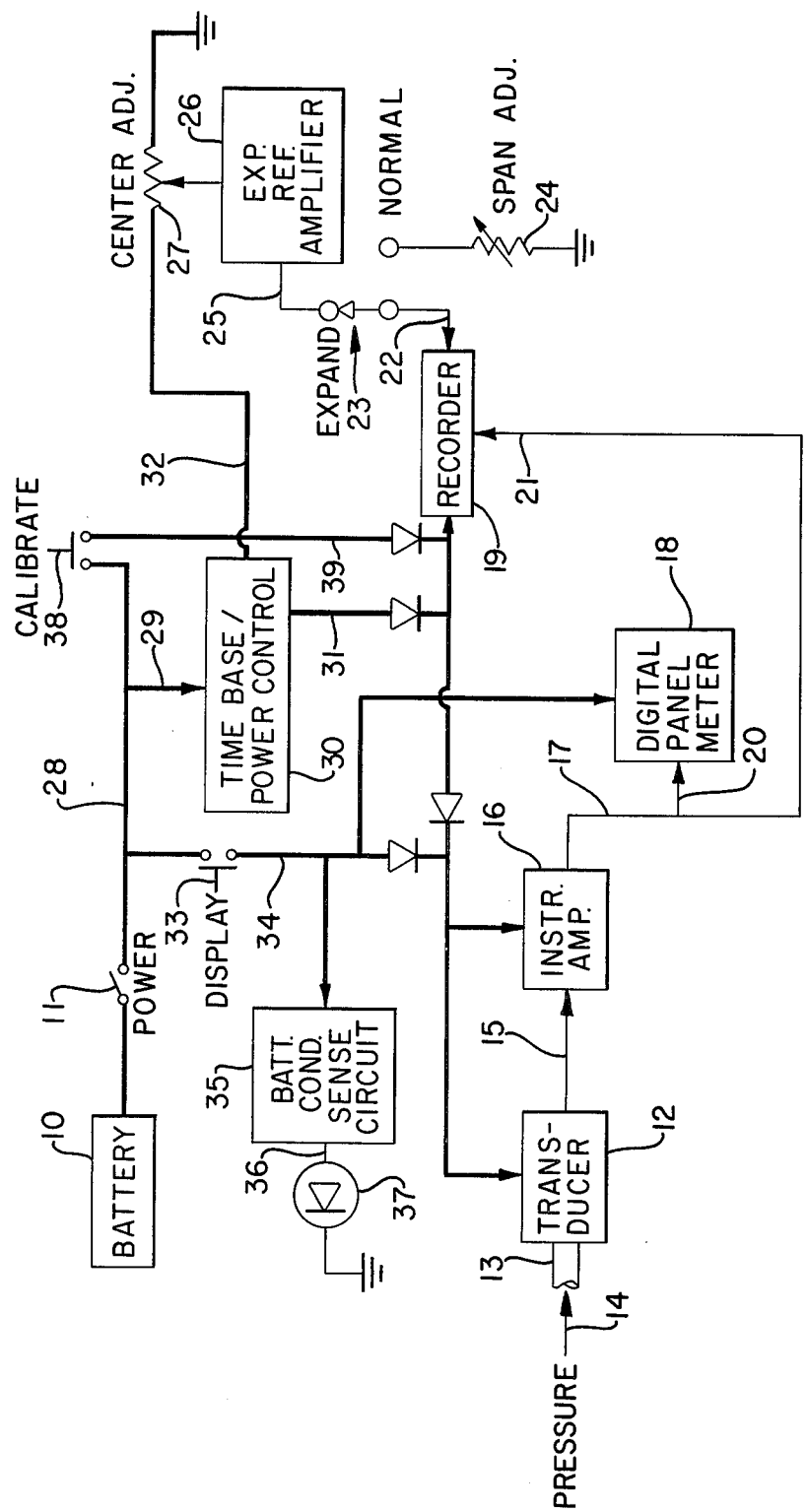

United States Patent [19]

McCracken

[11] 4,107,697
[45] Aug. 15, 1978

[54] PRESSURE RECORDER WITH POWER CONSERVATION MEANS

[75] Inventor: Oliver W. McCracken, Richardson, Tex.

[73] Assignee: Otis Engineering Corporation, Dallas, Tex.

[21] Appl. No.: 821,489

[22] Filed: Aug. 3, 1977

[51] Int. Cl.$^2$ ............................................. G01D 9/00
[52] U.S. Cl. .................................. 346/33 R; 346/17; 346/65
[58] Field of Search ................. 346/17, 33 R, 33 TP, 346/65, 139 R

[56] References Cited

U.S. PATENT DOCUMENTS

| | | | |
|---|---|---|---|
| 2,594,136 | 4/1952 | Di Maggio, Jr. | 346/33 TP |
| 3,173,744 | 3/1965 | Eisele | 346/33 R X |
| 3,217,221 | 11/1965 | Heggen et al. | 346/33 R X |
| 3,220,012 | 11/1965 | Schwertz | 346/17 X |
| 3,441,945 | 4/1969 | Leidy, Jr. et al. | 346/139 R X |
| 3,569,741 | 3/1971 | Bolick, Jr. et al. | 346/33 R X |
| 3,786,511 | 1/1974 | Bates et al. | 346/33 R |

*Primary Examiner*—George H. Miller, Jr.
*Attorney, Agent, or Firm*—Warren H. Kintzinger

[57] ABSTRACT

An instrument for recordation and time monitoring of pressure, as at a remote wellhead site. The instrument is battery powered, and means for conservation of battery power include powering the device intermittently under control of low power-drain CMOS clock timing circuits. Relatively higher power-drain calibration and display modes are continuously powered only on operator demand. In any operating mode, only those elements necessary to effect the mode are powered, either on an intermittent or continuous basis, as appropriate to realize the mode objective.

13 Claims, 2 Drawing Figures

PRESSURE RECORDER WITH POWER CONSERVATION MEANS

This invention relates in general to pressure recording devices, and in particular, to a self-contained battery-operated recording device employing solid state control and logic circuitry providing time-based intermittent power control to extend battery life.

The device to be described is basically a recording voltmeter device employing a stylus deflecting in proportion to an input voltage which causes a visual indication to be imprinted on a moving chart to thereby provide a readout of voltage input as some preselected function of time determined by rate of chart advance per unit of time.

In the device to be described, the voltage to be recorded comprises the output from a pressure transducer which might be connected to an oil wellhead to produce an output voltage which bears a scaled magnitude relationship with wellhead pressure such that the recorder stylus deflection is an indication of wellhead-pressure and may be so recorded on an appropriately calibrated moving chart. Because wells are oftimes remotely located, it is desirable that a wellhead pressure recording instrument be battery powered and thus self-contained and independent of external power sources. Therefore, such a self-contained portable instrument must desirably operate for a maximum period of time on a fully charged battery complement, and it is to this obviously desirable utilitarian feature that the present invention is especially directed.

Firstly, a continuous recording of wellhead pressure is not essential to successful monitoring of wellhead pressure and, accordingly, it is an object of the present invention to provide a pressure recorder with clock controlled intermittent power application and attendent power conservation.

A further object of the invention is the provision of a self-contained battery powered pressure recording device employing a low power drain solid state clock and appropriate logic gating circuitry by means of which power may be periodically applied to the device.

Another object of the invention is to provide a pressure recording instrument employing solid state circuitries to periodically apply battery power to the device during operation to periodically supply regulated operating voltages to instrument amplifier and transducer means, with recording accuracy comparable to that of a dead-weight tester.

Still another object is provision of a pressure recorder instrument operable to periodically record pressure over a full operationally defined range of pressures, or selectively to periodically record pressure variation about a selected pressure level within the range with greatly increased sensitivity for purposes of monitoring well stability.

Features of this invention useful in accomplishing the above objects include, in a pressure recording apparatus of the type comprising a time-base driven chart and pressure deflected imprinting stylus, a solid state clock generating means responsive to initial power application to periodically develop a logic gating output signal. Logic gating circuitries, responsive to the logic gating output signal, apply the power source to the chart recorder to effect a recording of monitored pressure at that time as well as supplying collector power source voltage to logic circuits, with simultaneous application of the power source to regulated voltage output devices which power the system transducer and instrumentation amplifier devices employed. Periodic power application is overriden for selectively prolonged power application used in display of instant pressure of a digital pressure readout device and calibration of the recorder for either a full scale normal recording mode or an expanded scale, suppressed zero, pressure stability recording mode.

A specific embodiment representing what is presently regarded as the best mode of carrying out the invention is illustrated in the accompanying drawings.

Figure 2:
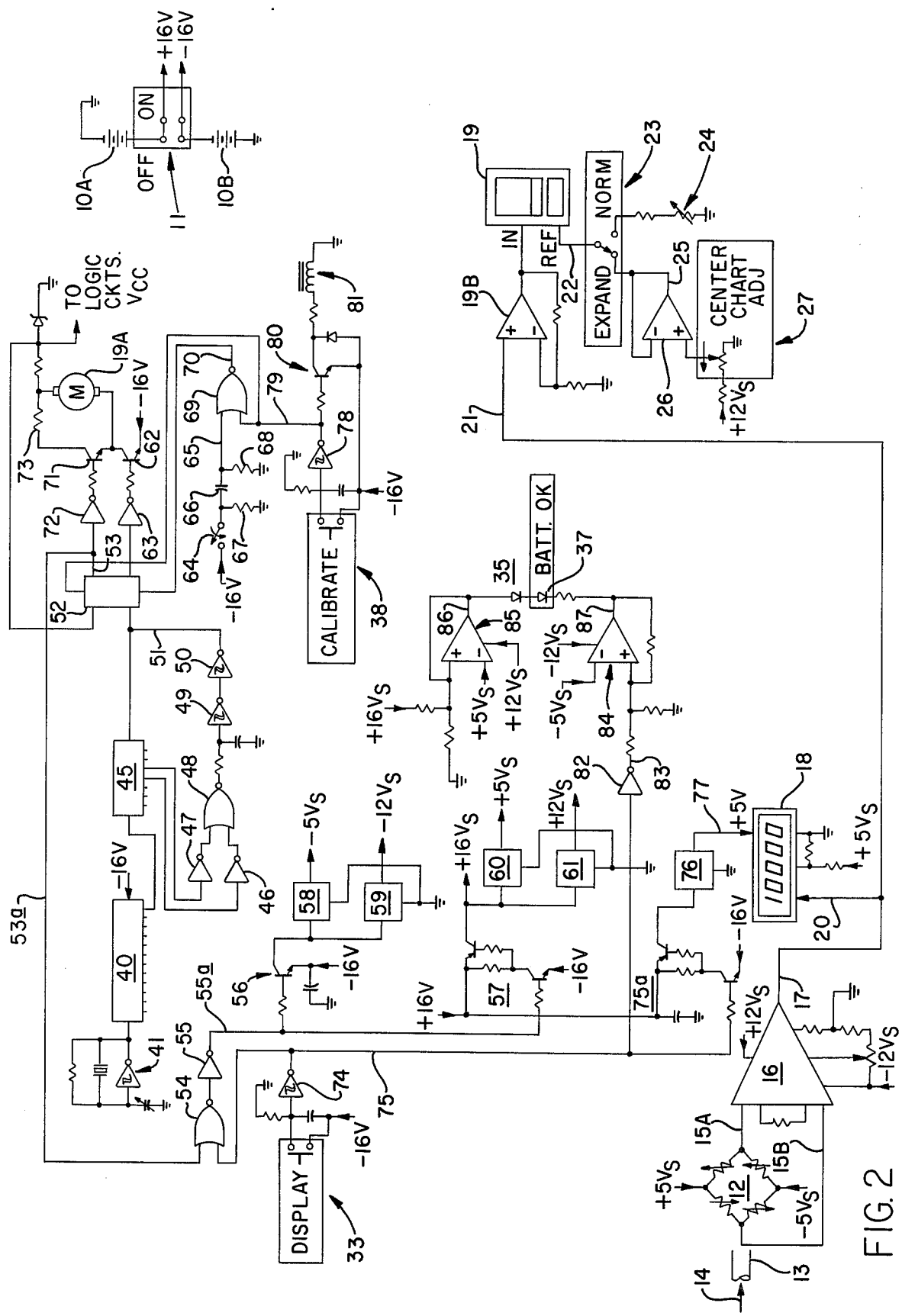

In the drawings:

FIG. 1 represents a functional block diagram of a periodically powered, self-contained pressure recording device; and FIG. 2, a schematic diagram of an implemented embodiment of the system of FIG. 1.

Referring to the drawings:

A pressure recording device, in accordance with the present invention is functionally depicted in FIG. 1. Power is supplied through the entire unit from battery 10 through On-Off switch 11. Power distribution is depicted in heavy line, and power paths are functionally defined by isolation diodes in the depicted distribution.

The recording elements are functionally depicted in the lower portion of FIG. 1 as including a pressure transducer 12 with input port 13 to which a pressure source 14 may be connected. Transducer 12 has the conventional ability to produce an electrical analog output 15 of the pressure applied thereto and may include a pressure-sensitive bridge network to which a supply voltage is applied and which is unbalanced to produce an output which is an electrical analog of the applied pressure.

The analog output 15 of transducer 12 is applied to an instrument amplifier 16, with the output 17 from the amplifier compatible with a digital panel meter 18 and the stylus (not shown) of a chart recorder 19 to which it is respectively connected as inputs 20 and 21. Digital panel meter 18, when energized by power application, displays a digital readout of the pressure applied to transducer 12. Assuming pressure to be measured is in the range of 0 psi to 10,000 psi, and the transducer having the ability to produce an electrical analog of applied pressure, the digital panel meter 18 may display the voltage output 17 from instrument amplifier 16, with the calibration of instrumentation amplifier 16 being such that when 9,999 psi is applied to the transducer 12, the amplifier has an output of 0.9999 volts. Digital panel meter 18, being a voltage sensitive meter, would display the digits 9999 without a decimal point, and therefore, the display would be calibrated in engineering units with meter 18 reading the pressure applied to pressure line 13 in pounds per square inch of gauge pressure.

The output 17 of instrument amplifier 16 is also applied as input 21 to the recorder 19 to defect the recorder stylus in proportion thereto. A reference input 22 is applied to recorder 19 for purposes of selectively adjusting the "zero" position of the recorder stylus and the sensitivity of the recorder. As functionally depicted in FIG. 1, the recorder may be operated in two modes. The first, or "NORMAL" mode is a simple deflection mode effected by function switch 23 being in "NORMAL" position to effect a recorder stylus displacement from a chart base line one division per 1000 pounds of pressure applied to transducer 12 with "SPAN" adjust provided by control 24.

A second mode, "EXPAND" is effected by placing switch 23 in "EXPAND" position to thereby connect the output 25 of a reference amplifier 26 as reference input 22 to recorder 19. This, in effect, causes a suppressed "0" for recorder 19 such that very small changes of input voltage 21 from instrumentation amplifier 16 will cause the recorder stylus to deflect, i.e., the sensitivity of the recorder is appreciably increased. In "EXPAND" mode, the stylus is centered on the recorder chart by adjustment of center adjust control 27, which adjusts the expanded reference voltage 25 from reference amplifier 26. For example, in the expanded mode, the recorder stylus may be caused to deflect from its chart-center base line to the chart edge when a change in pressure of 50 psi occurs at the input pressure line 13.

As above stated, in either of the "NORMAL" or "EXPAND" recording modes of the instrument, power is applied to the entire unit on a periodic basis for purposes of extending battery life. For purposes of digital panel meter display of pressure to within 1 psi, used for a commanded exact readout, and for chart calibration purposes to be further described, provision is made for continuous power application to only those elements of the instrument required to be operational for the intended purpose, again in the interest of extending battery life. FIG. 1 accordingly depicts selectively different power distribution permutations, each effected by actuation of an associated control button or switch.

In a first power application mode, with On-Off switch 11 closed, power is functionally depicted as being applied on line 28 as power input 29 to a time base/power control circuitry 30. Control circuitry 30, to be further described, may comprise a clock oscillator, and binary divider circuitry to develop a logic control output pulse on a period basis, for example, every twelve seconds. Logic gating circuitry response to the periodic control pulse may then apply power either as battery voltage per se, or as regulated voltage derived from battery power being switched to voltage regulator circuitries, on to power control output lines 31 and 32. Output line 31 applies power to transducer 12, instrumentation amplifier 16 and recorder 19 (to the chart motor drive thereof) on a periodic basis, for example, for a predetermined interval each twelve seconds. Thus a recording of pressure is made each twelve seconds. Recorder 19 may be of the galvanometer type with a striker bar to impress a mark on a carbon impregnated paper chart. The recorder would then advance, upon chart motor power application thereto, each twelve seconds until the striker bar falls on the marker, whereupon the striker bar is captured until the next advance.

In a second power application mode, the instant pressure reading may be displayed on digital panel meter 18 by depression of "DISPLAY" control button 33 to switch power from line 28 on a continuous basis via line 34 directly to the transducer 12, instrumentation amplifier 16 and digital panel meter 18 to display instant pressure digitally, with recorder 19 continuing to be powered on in periodic basis from time base/power control 30. With "DISPLAY" button 33 depressed for digital readout of pressure on meter 18, power suplied on line 34 to transducer 12, instrumentation amplifier 16 and meter 18 is monitored by a battery condition sensing circuit 35 with output 36 energizing LED 37 only when power levels are sufficient for readout accuracy.

In a third power application mode, recorder calibration may be effected by depression of "CALIBRATE" switch button 38 to switch power on line 28 through line 39 to transducer 12, instrumentation amplifier 16, and recorder 19. Calibration, to be further described, may then be made with depressed "CALIBRATE" switch 38 providing power for continuous recording. Upon switch 38 being released, recording continues on a periodic basis (each twelve seconds).

Referring now to FIG. 2, a schematic embodiment of an implementation to achieve the afore described functional objectives is shown, with elements therein corresponding to like elements in FIG. 1 being like referenced. The embodiment employs CMOS clock/timing circuits and solid state commercially available functional elements, all in the interest of reduced power requirement, with only the CMOS clock/timing circuits being continuously powered, but drawing less than 1 ma. The functional power distribution permutations depicted in FIG. 1, and described above, are implemented as logic controlled solid state switches which apply battery power to the recorder drive motor and to voltage regulators supplying operating voltages to the transducer and recorder stylus driving circuits. In order that the reading and recorder trace be made time and temperature stable, the embodiment employs the following power considerations:

1. + and − batteries to allow the amplifiers to null to ground.
2. Power voltage regulators to allow battery drift without corresponding circuit shift.
3. A separate power regulator for the digital panel meter display, since it requires the greatest power in the unit.

The lower portion of FIG. 2 illustrates transducer 12 as comprising a resistive, pressure sensitive bridge network. The bridge is powered by selectively developed +5V and −5V regulated voltage sources. The output 15A–15B of the bridge is applied as respective input to instrument amplifier 16, embodied as a type BB3625B functional element. Output 17 from amplifier 16, appropriately scaled, is applied as input 20 to digital panel meter 18 and as input 21 to a scaling amplifier 19B supplying stylus deflecting input signal to strip chart recorder 19. The reference input 22 to recorder 19 is selectively connected via the NORMAL position of switch 23 through a resistive means, including span adjust variable resistance control 24, to ground. Reference input 22 to recorder 19 is, alternatively, via the EXPAND position of switch 23, connected to the output 25 of an expand reference amplifier 26. Output 25 of the operational amplifier 26 is connected to the inverting input thereof, and the non-inverting input of amplifier 26 is connected to a selectively variable voltage defined by the setting of CENTER adjust potentiometer 27, the latter being connected to a selectively activated +12V regulated voltage source.

Transducer 12 is powered by selectively activated +5 volt and −5 volt sources, instrument amplifier 16 by selectively activated +12 volt and −12 volt sources, and expand reference amplifier 26 by a selectively activated +12 volt source. These selectively activated ±5 volt and ±12 volt sources comprise the outputs of voltage regulators which are switched on, either on a periodic basis, or on a continuous basis, defined by operational modes of this unit, to be further defined with specific reference to the FIG. 2 embodiment.

NORMAL RECORD MODE

Referring now to the upper portion of FIG. 2, the time base/power control functional block of FIG. 1 comprises a clock count-down circuit which, upon the closing of On-Off switch 11 to apply battery power of 16V, produces one output pulse every twelve seconds. To this end, counters 40 and 45, along with inverters 46 and 47, NOR gate 48, and Schmitt triggers 49 and 50, divide a frequency of 32.768 KHz generated by a crystal controlled oscillator 41 down to one pulse each twelve seconds which appears on output control line 51. The pulse on line 51 is applied as a reset to counter 45 and as clock input to a type CD4013 flip-flop 52 to set the flip-flop for a logic "1" Q output 53. Q output 53 is connected via line 53a as input to a NOR gate 54, the output of which is applied through inverter 55 to produce a logic "1" signal level on control line 55a.

Line 55a is connected as a switching input line to each of transistor switching circuits 56 and 57 which are turned on by a logic "1" level on input line 55a. Transistor switching circuit 56, when activated, applies −16V battery supply to the input of each of two voltage regulators 58 and 59. Regulator 58, which might comprise a type LM320T-5, provides a −5V regulated output. Voltage regulator 59, which might comprise a type LM-320T-12, provides a −12V regulated output. Transistor switch 57 provides +16V battery supply to the input of each of two regulators 60 and 61. Regulator 60, which might comprise a type LM-340T-5, provides a a +5V regulated output, while regulator 61, which might comprise a type LM-340T-12, provides a +12V regulated output.

Regulators 58-61 thus power the transducer 12 at ±5 volts and transducer amplifier 16 at ±12 volts.

Now, referring again to flip-flop 52, the $\bar{Q}$ output, which is switched to logic "0" by the timer output pulse 51, is inverted at 63 to switch on transistor 62 and connect −16V battery supply to the recorder motor 19A. When the recorder stylus (not shown) strikes the recorder roll chart, a sensing switch 64, functionally depicted in the upper right portion of FIG. 2, is closed to supply, via R-C network 66–68, an input 65 to NOR gate 69. Output 70 of NOR gate 69 is applied as a reset to flip-flop 52 to set Q low, $\bar{Q}$ high, and thus turn off the recorder drive motor 19A and the transistor switches 56-57 which turn off the ±12V and ±5 volt regulators powering the transducer, the transducer amplifier and the recorder. Recorder motor 19A is provided with an electrical brake circuit formed by transistor 71, inverter 72 and resistor 73. When the flip-flop Q output 53 goes to "0", transistor 71 is applied to a "1" logic level from inverter 72 and switches on to stop the motor quickly by shunting the motor with a low value resistor 73. This brake circuit stops the motor such that the recorder will not strike the chart paper a second time and "traps" the recorder stylus, thus providing a "mechanical hold" of the last recording between sampling periods which are effected each twelve seconds.

PRESSURE DISPLAY BATTERY SENSING MODE

The afore described digital display of pressure is selectively enabled by depression of the DISPLAY switch 33, depicted in the upper-left portion of FIG. 2. With DISPLAY switch 33 depressed, switching means comprised of Schmitt trigger element 74 and associated input R-C network, applies a logic "1" pulse on trigger output 75, for as long as the DISPLAY switch is depressed, to turn on a further transistor switching circuit 75a and switch on voltage regulator 76 to supply regulated +5V as input 77 to the digital panel meter 18. At the same time, the trigger output line 75 supplies the constant logic level "1" as a second input to NOR gate 54 to continuously develop a logic "1" level on control line 55a, which, as above-described, turns on transistor switches 56 and 57 to provide ±5V and ±12V regulated power from regulators 58-61 and thus power the transducer and transducer amplifier. This enables the operator to obtain, upon demand, a continuous precise reading of pressure on digital panel meter 18, so that this information may be recorded. Upon release of the DISPLAY button, sampled recording continues at twelve-second intervals.

With DISPLAY switch 33 depressed for obtaining a readout of pressure on digital panel meter 18, the condition of the batteries 10A and 10B is sensed. Referring to the central portion of FIG. 2, a battery condition sensing circuit 35 is seen to comprise a pair of operational amplifiers 84 and 85. Amplifier 85 is powered by +12 volts from voltage regulator 61 and amplifier 84 by −12V from voltage regulator 59. Amplifier 85 develops an output 86 from differential comparison of +16V battery source (switched through transistor switching circuit 57) and the +5 volt output from voltage regulator 60. Amplifier 84 develops an output 87 from differential comparison of −16V battery source (the switched output 75 from DISPLAY switching means Schmitt trigger element 74, as inverted by inverter 82 onto input line 83) and the −5 volt output from voltage regulator 58. Output 86 of operational amplifier 85 is connected through a diode member, LED 37, and resistance member to the junction of the output 87 of operational amplifier 84 and a feedback loop of amplifier 84. Sensing circuit 35 operates to light LED 37 only when battery voltage is above a critical amount, indicating to the operator that the battery supply is reliable.

CALIBRATED EXPANDED RECORD MODE

The recorder may be operated in an expanded scale mode for the purpose of recording, with sensivity greatly increased over that in NORMAL recording, by placing the EXPAND-NORM switch 23 of FIG. 2 in the depicted EXPAND position to apply a reference voltage 25 from expand reference amplifier 26 as reference input 22 to the recorder 19. A suppressed zero for the recorder is then effected such that very small changes of input voltage from instrumentation amplifier 16 cause the recording stylus to deflect. The trace in the EXPAND mode may be centered on the recorder paper by adjusting the CENTER CHART ADJ. potentiometer 27. In the EXPAND mode, the recorder may be adjusted to deflect from a center base line to the paper edge with a 50 psi pressure change applied to transducer 12.

Centering of the expanded trace on the recorder paper is accomplished by depression of CALIBRATE switch 38 (depicted in the upper-right portion of FIG. 2) which develops a logic level output from Schmitt trigger element 78 on line 79 to set flip-flop 52 for a high Q output 53. This flip-flop set is overriding and thus effects power application to the transducer 12, instrumentation amplifier 16, and recorder motor 19A on a continuous basis to record a trace on the recorder chart. This continuous trace may be centered on the chart by adjustment of CHART CENTER ADJUST potentiometer 27. When CALIBRATE switch 38 is released, the unit will continue to power these elements on an intermittent basis.

During the depression of CALIBRATE switch 38, Schmitt trigger 78 switches on transistor switch 80 to apply −16V battery power to an event marker solenoid 81. With solenoid 81 so powered, it may be utilized in conjunction with an associated scribe, (not shown) to make an edge mark on the recorder chart paper to signify that the time scale on that portion of the recorder chart is not the normal time scale of the recording (the continuous running speed of the recorder chart being appreciably greater than the composite speed determined by the duty cycle of power during pressure monitoring operation).

OPERATION SUMMARY

The unit is operated by connecting a pressure source to be measured to the pressure input 13 and turning the ON/OFF switch 11 ON. The strip chart recorder will begin recording one mark on the chart paper every twelve seconds. Pressure may be accurately read out on demand by pressing the DISPLAY switch 33.

To record pressure on the exampled 0–10,000 psi scale, the NORM/EXPAND switch 23 is placed in NORM position.

To record with a full-scale sensitivity of the exampled 100 psi about any static pressure up to 10,000 psi, the DISPLAY switch 33 may be depressed to obtain readout on digital panel meter 18 to the nearest pound per square inch. The CENTER CHART ADJUST control may then be turned to an associated dial readout position corresponding to the reading on the digital panel meter, to roughly center the recorder stylus on the chart paper. The NORM/EXPAND switch 23 may then be placed in EXPAND position, and the CALIBRATE button depressed to cause the recorder to run continuously while the CENTER CHART ADJUST control is fine-positioned to center the trace on the chart. The existing midscale pressure read from panel meter 18 may be written on the chart. EXPAND mode is useful in precise monitoring with high sensitivity, the pressure deviation about a predetermined midscale pressure, and is useful in determining pressure stability—well stability when employed in monitoring wellhead pressure. Should the trace in the expanded mode move off scale, the calibration procedure is repeated, with a new chart center midscale pressure written on the chart.

The present invention is thus seen to provide a versatile instrument for recordation and time monitoring of pressure, as at a remote wellhead site. The instrument is self-contained and independent of outside power sources. Conservation of battery power is accomplished by operational modes which power the device intermittently under control of low power drain CMOS clock timing circuits. Relatively higher power drain calibration modes are continuously powered only on operator demand by depression of momentary switch button controls which, upon release, cause pressure recordation to continue on a low power drain intermittent basis.

Whereas this invention is herein illustrated and described with respect to a particular embodiment thereof, it should be realized that various changes might be made without departing from the essential contributions to the art made by the teachings hereof.

I claim:

1. In a recording voltmeter apparatus comprising a driven chart recorder and chart imprinting stylus, with said chart being drivable at a predetermined rate and said stylus being deflectable in proportion to an input voltage from a pressure-voltage transducer; means responsive to a selectable first operating mode to power said transducer and chart recorder at predetermined periodic intervals to define a predetermined power application duty cycle, with deflection of said stylus with a predetermined sensitivity from a chart-edge extreme being proportional to an input voltage to be recorded, means responsive to a selectable second operating mode to effect a continuous readout from digital display means of said input voltage being measured, means enabled during said second operating mode to effect centering of said stylus on said chart, and means operable in a third operating mode to effect, with sensitivity substantially greater than such predetermined sensitivity, stylus deflection over a predetermined range either side of said centered stylus position with said transducer and chart recorder being powered at said predetermined power application duty cycle.

2. The apparatus of claim 1, with said first operating mode being effected by a selected position of a first switching means through which a power supply is connected to a timing means, with said timing means connected to periodically connect said power supply to said transducer and chart recorder means.

3. The apparatus of claim 2, with said second operating mode being effected by a selected position of a second switching means through which said power supply source is continuously connected to said transducer means and, to said digital display means.

4. The apparatus of claim 3, with said stylus being deflectable in response to the differential between said input voltage to be recorded and a reference voltage, and comprising a third switching means through which respective ones of first and second voltage sources are selectable as said reference voltage.

5. The apparatus of claim 4, with said timing means comprising a clock oscillator providing an output pulse train having a repetition rate defining the rate of said predetermined periodic intervals, and logic switching means receiving said pulse train and being periodically enabled thereby to connect said power supply source to said voltmeter recording means.

6. The apparatus of claim 5, with said input voltage comprising the output of a pressure-to-voltage transducer.

7. The apparatus of claim 6 with said digital display means comprising a digital voltmeter including a multi-bit digital readout the least significant bit of which defines the scale factor of the voltage output from said transducer.

8. A recording voltmeter, comprising a motor driven strip chart and recording stylus, said recording stylus being deflectable transverse of the driven axis of said chart in proportion to an input voltage to be recorded, means to impact said stylus on the surface of said chart as a periodic function of the drive imparted to said chart, sensing switching means operable upon said stylus being in chart-impacted position; a battery power supply, timing means responsive to application of said battery power supply thereto to generate an output pulse train of predetermined repetition rate, logic switching means receiving said pulse train and responsive to each pulse of said pulse train to connect said battery power supply to said strip chart drive motor, said logic switching means being responsive to said operation of said sensing switching means to disconnect said battery power supply from said strip chart drive motor; transducer means for developing said input voltage to be measured, and further logic switching means connected to said logic switching means and to said power supply to so connect operating power to said transducer means during time intervals between the time occurrence of each said timing means output pulse and the next succeeding operation of said sensing switching means.

9. The recording voltmeter of claim 8, further comprising a digital display means connected to receive the output of said transducer means and a first manually operable switch means connected to said further logic switching means, said first switch means, when operated, causing said further logic switching means to continuously supply operating power to each of said digital display means and said transducer means.

10. The recording voltmeter of claim 9, further comprising a second manually operable switch means developing a predetermined output voltage logic level when operated, means connecting said output voltage logic level to said logic switching means, and said logic switching means being operable in response to said predetermined voltage logic level to connect said battery power supply to said chart drive motor and override the power disconnection normally effected by operation of said sensing switching means, thereby continuously powering said drive motor and said transducer means.

11. The recording voltmeter of claim 10, with said logic switching means comprising a flip-flop logic circuit with said timing means pulse train being connected as a clock input thereto, and transistor switch means responsive to one of the Q and $\overline{Q}$ outputs of said flip-flop to connect said battery power supply to said chart drive motor.

12. The recording voltmeter of claim 11, with said further logic switching means comprising logic gating means connected to and responsive to a predetermined output from said flip-flop or first manually operable logic switching means to connect said battery power supply to voltage regulator means, and the output from said voltage regulator means connected to power said transducer means.

13. The recording voltmeter of claim 12, further comprising a further voltage regulator means, further switching means responsive to said predetermined output from said first manually operable switching means to connect said battery power supply to said further voltage regulator means, with the output of said further voltage regulator means connected to, and powering, said digital display means.

* * * * *